(12) United States Patent
Väre et al.

(10) Patent No.: US 8,159,982 B2
(45) Date of Patent: Apr. 17, 2012

(54) METHOD, SYSTEM AND NETWORK ENTITY FOR PROVIDING DIGITAL BROADBAND TRANSMISSION

(75) Inventors: Jani Väre, Kaarina (FI); Matti Puputti, Turku (FI); Harri Pekonen, Raisio (FI); Kimmo Laiho, Turku (FI); Tommi Auranen, Turku (FI)

(73) Assignee: Nokia Corporation (FI)

( * ) Notice: Subject to any disclaimer, the term of this patent is extended or adjusted under 35 U.S.C. 154(b) by 863 days.

(21) Appl. No.: 10/542,980

(22) PCT Filed: Jan. 21, 2003

(86) PCT No.: PCT/FI03/00047
§ 371 (c)(1),
(2), (4) Date: Mar. 9, 2006

(87) PCT Pub. No.: WO2004/066652
PCT Pub. Date: Aug. 5, 2004

(65) Prior Publication Data
US 2006/0258324 A1    Nov. 16, 2006

(51) Int. Cl.
*G08C 17/00* (2006.01)
(52) U.S. Cl. ........... 370/311; 370/318; 455/522; 455/69
(58) Field of Classification Search .................. 455/574, 455/127.1–127.5, 343.1–343.6, 522, 69; 370/311, 318
See application file for complete search history.

(56) References Cited

U.S. PATENT DOCUMENTS
5,371,734 A * 12/1994 Fischer .................. 370/311
(Continued)

FOREIGN PATENT DOCUMENTS
CN    1380796    11/2002
(Continued)

OTHER PUBLICATIONS

Hu, Q. et al. "A comparison of indexing methods for data broadcast on the air". In: Twelfth International Conference on Information Networking, 1998. (ICOIN-12) Proceedings. Tokyo, Japan, Jan. 21-23, 1998, pp. 656-659, INSPEC AN: 5856640, see abstract; section 1.

(Continued)

*Primary Examiner* — Kamran Afshar
*Assistant Examiner* — Sayed T Zewari
(74) *Attorney, Agent, or Firm* — Banner & Witcoff, Ltd.

(57) ABSTRACT

A method, a system, a transmitter and a receiver for identification of a time sliced elementary streams using PSI/SI tables. This identification provides a way to separate time-sliced elementary stream from non-time-sliced elementary streams by defining two descriptors in PSI/SI tables. A time slice identifier descriptor is defined, which can be used to identify elementary streams which are time sliced. This descriptor is also used to provide additional information about the transmitted elementary streams. The invention provides a way to announce additional information of the time sliced elementary streams via PSI/SI tables. Additionally, it provides a mechanism to categorize single elementary stream(s) as non-time sliced and time sliced. A way to identify time sliced elementary streams carried over DVB networks is disclosed and providing additional information on those streams. This can be done by using the time slice identifier descriptor. The descriptor can be used at least in Network Information Table (NIT), Program Map Table (PMT) and IP/MAC Notification Table (INT) tables. Time slicing provides a way to save power in the receiver in broadband transmission.

56 Claims, 8 Drawing Sheets

U.S. PATENT DOCUMENTS

| | | | |
|---|---|---|---|
| 5,382,949 | A | 1/1995 | Mock et al. |
| 6,175,557 | B1 | 1/2001 | Diachina et al. |
| 6,373,904 | B1 | 4/2002 | Sakamoto et al. |
| 6,505,347 | B1 | 1/2003 | Kaneko et al. |
| 6,963,736 | B2 | 11/2005 | Tahtinen |
| 7,110,419 | B1 * | 9/2006 | Linander ........................ 370/461 |
| 7,130,313 | B2 | 10/2006 | Pekonen |
| 7,844,214 | B2 | 11/2010 | Laiho et al. |
| 2002/0018473 | A1 | 2/2002 | Hassell et al. |
| 2002/0159541 | A1 | 10/2002 | Tahtinen |
| 2004/0120279 | A1 * | 6/2004 | Huckins ........................ 370/328 |
| 2005/0215226 | A1 | 9/2005 | Tahtinen |

FOREIGN PATENT DOCUMENTS

| | | |
|---|---|---|
| EP | 0975109 | 1/2000 |
| EP | 1 253 721 A | 10/2002 |
| JP | 7-505993 | 6/1995 |
| JP | 2002-523939 | 7/2002 |
| WO | 93/22883 A1 | 11/1993 |
| WO | 02/080590 A2 | 10/2002 |
| WO | WO 02082834 A1 | 10/2002 |

OTHER PUBLICATIONS

Office Action dated Feb. 9, 2007, from the Patent Office of the People's Republic of China, Patent Application No. 03825825.0.

Decision of Final Rejection for Japanese Patent Application No. 2004-566841 mailed Sep. 29, 2009, 4 pages.

Canadian Office Action dated Dec. 1, 2009, for Application No. 2,513,843, 5 pages.

Ahmavaara K., et al., "Broadcast and Multicast Services in Mobile Networks", XVII World Telecommunications Congress 2002, Paris,France Sep. 22-27, 2002.

Japanese Application No. 2004-566841—Office Action dated Nov. 15, 2011.

* cited by examiner

METHOD, SYSTEM AND NETWORK ENTITY FOR PROVIDING DIGITAL BROADBAND TRANSMISSION This application is a National Stage application of copending PCT application PCT/FI2003/000047 filed Jan. 21, 2003, which was published in English under PCT Article 21(2) on Aug. 5, 2004. This application is incorporated herein by reference in it entirety.

TECHNICAL FIELD OF THE INVENTION

This invention relates to systems, methods, and network entities for distributing data over a communication link.

BACKGROUND OF THE INVENTION

Broadcast has an almost century long tradition in radio. Even with TV, the history goes back to 1930's. Broadcasting has been successful throughout the world in bringing both entertainment and information to mass audiences.

The latest step in broadcasting is the digitalization of both radio and TV. Digital radio has not gained much acceptance on the market. However, many hope that digital TV will bring new benefits and services to the consumer and, as a result, generate new revenue streams for the broadcasting industry. The basic concept of the TV service itself has, however, not changed much. Rather, the TV lives on as before even if it has become digital.

In later half of 1990's we saw the boom of the Internet. A whole set of new services and content became available to the consumers during a short, revolutionary and hype intense period. That period introduced e-commerce, Internet Service Providers (ISPs), Portals, eyeballs game, dotcom companies and even the new economy. The developments in both access technologies (e.g. ADSL) and coding technologies (e.g. MPEG4 streaming) have made it possible to bring rich media content like video content to homes via the Internet. Despite of these technology and market breakthroughs media houses have been reluctant to distribute their content via the Internet due to its "free-of-charge" nature and the direct threat of piracy. Neither has Internet been able to challenge the role of traditional media as the primary advertisement platform despite its great popularity.

Broadcast provides the receiver device with huge amount of information. The receiver device needs to obtain linking and guidance information from broadcast information for obtaining services and/or portions of the service which can be indicated in the linking and guidance information. The linking and guidance information is typically contained in Service Information (SI) indicating and guiding the discovery of the services. The SI indicates various services of at least one broadcast network.

Latest appliances of broadcast have raised a need for power consumption consideration in the receiver, and some efforts for reducing power consumption in the receiver have been made. However, although these efforts are consistent with the SI, the receiver and the system do not benefit enough. Moreover, they are blind in respect of the broadcasting. In this case the receiver cannot detect, which of the streams carried within a multiplex are adapted to fit the power reduction principles and, possibly, which are not.

In view of various inherent limitations of broadcasting, it would be desirable to avoid or mitigate these and other problems associated with prior art systems. Thus, there is a need for identifying parts of broadband transmission in respect of the power consumption principles.

SUMMARY OF THE INVENTION

Now a method and arrangement have been invented to identify the parts of the broadband transmission in respect of the power consumption principles.

In accordance with an aspect of the invention there is provided a method for receiving a digital broadband transmission for saving power in a receiver, the method comprising the steps of: providing information on parts of the digital broadband transmission, which are adapted to fit for saving the power in the receiver, for detecting said parts in the receiver, detecting said parts based on said provided information, and switching at least part of the receiver on/off based on said provided information.

In accordance with another aspect of the invention there is provided a method for transmitting a digital broadband transmission for saving power in a receiver, the method comprising the steps of: providing information on parts of the digital broadband transmission, which are adapted to fit for saving the power in the receiver, for categorising said parts for an identification in the receiver, and categorising said parts based on said provided information for switching at least part of the receiver on/off in accordance with said provided information.

In accordance with yet another aspect of the invention there is provided a system for providing a digital broadband transmission for saving power in a receiver, comprising: means for providing information on parts of the digital broadband transmission, which are adapted to fit for saving the power in the receiver, for detecting said parts in the receiver, means for detecting said parts based on said provided information, and means for switching at least part of the receiver on/off based on said provided information.

In accordance with yet another aspect of the invention there is provided a receiver for receiving a digital broadband transmission for saving power in a receiver, comprising: means for receiving information on parts of the digital broadband transmission, which are adapter to fit for saving the power in the receiver, for detecting said parts, means for detecting said parts based on said received information, and means for switching at least part of the receiver on/off based on said received information.

In accordance with yet another aspect of the invention, there is provided a transmitter for transmitting a digital broadband transmission for saving power in a receiver, comprising: means for providing information on parts of the digital broadband transmission, which are adapted to fit for saving the power in the receiver, for categorising said parts for an identification in the receiver, and means for categorising said parts based on said provided information for switching at least part of the receiver on/off in accordance with said provided information.

For better understanding of the present invention reference is made to the following description, taken in conjunction with the accompanying drawings, and its scope will be pointed out in the appending claims.

BRIEF DESCRIPTION OF THE DRAWINGS

The invention will now be described, by way of example only, with reference to the accompanying drawings, in which.

DETAILED DESCRIPTION OF THE EMBODIMENTS

Figure 1:
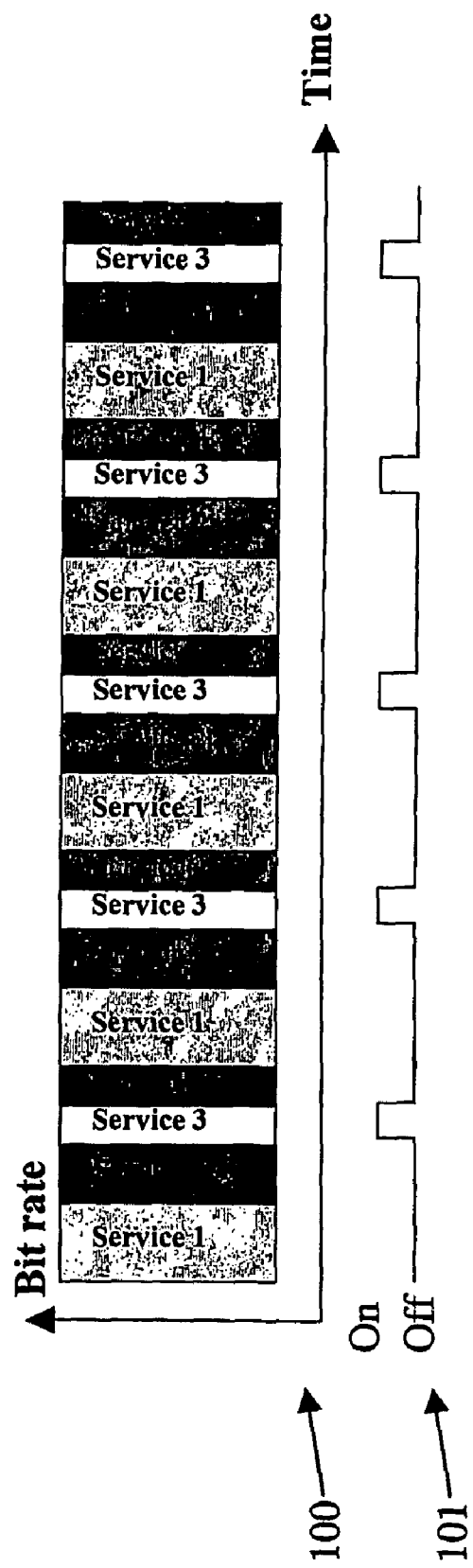
FIG. 1 shows an example of the digital broadband transmission and reception principle for such a transmission in accordance with an embodiment of the invention.

Digital Video Broadcasting (DVB) offers a high bandwidth broadband transmission channel wherein delivery is typically broadcast, multicast or alternatively unicast. The high bandwidth transmission channel can offer a user of such system various services. Identifications for obtaining the various services are necessary to focus on appropriate services models and receivers. DVB offers applicable principles, and preferably, a Terrestrial Digital Video Broadcasting (DVB-T) is applied in the embodied invention. Alternatively, the invention can be applied in transmissions according to Advanced Television Systems Committee (ATSC) to the appropriate extent.

The digital broadband transmission provides a receiver device with huge amount of data information. A nature of the digital broadband transmission is that the transmission is streaming distribution typically to multiple receivers applying broadcast, multicast, or alternatively even unicast point-to-point distribution to a single receiver. The receiver device should be able to find the relevant data information among the huge amount of transmitted data information. The receiver device requires certain parameters in order to be able to receive the relevant service and/or portions of the service(s) which can be intended for or desired by the receiver device. Because the digital broadband transmission can distribute a lot of data, it can also distribute the parameters which enable the receiver device to discover the service and/or the portion of the service(s) among transmitted information. These parameters are transmitted by digitally broadband transmission to the receiver device. The receiver device recognizes them and can modify itself in accordance with the parameters. Therefore, the receiver device can now start receiving the service, by identifying the relevant data from the huge amount of data in the broadband transmission. A data distribution link of the broadband delivery can be a wireless link, a fixed link, or a wired link. The digital broadband transmission system(s) may have an interaction with the receiver but the interaction is not a mandatory requirement. Because of the power consumption aspects in the receiver devices, where the power consumption is critical, for example mobile DVB receivers such as mobile DVB-T, it is beneficial to identify and focus on those parts of the DVB transmission which are adapted to fit into the power saving principles of the DVB transmission in the receiver device. For example, the receiver is functionally or even physically on during those time periods when the relevant transmission is transmitted, typically cyclically or alternatively asynchronically, and off otherwise. In addition, parameters for the power saving principles in the DVB transmission can be beneficially applied to deliver and announce additional information on the services and portions of the service(s) transmitted in accordance with the DVB power saving principles.

As used herein, transmission may refer to a broadcast, multicast, or unicast, and data can include but is not limited to, IP protocol-encoded data.

Preferable embodiments of the invention provide a method, a system, a transmitter and a receiver for identification of a time sliced elementary streams using PSI/SI tables. This identification provides a way to separate time-sliced elementary stream(s) from non-time-sliced elementary stream(s) by defining a descriptor in PSI/SI tables. The preferable embodiments define a time slice identifier descriptor, which can be used to identify elementary streams which are time sliced. Advantageously, this descriptor is also used to provide additional information about the transmitted elementary streams. Thus, the embodied invention provides the broadcasting environment a way to announce additional information about the time sliced elementary streams via PSI/SI tables. Additionally, it provides a mechanism to categorize single elementary stream(s) as non-time sliced and time sliced.

The preferable embodiments provide a way to identify time sliced elementary streams carried over DVB networks and providing additional information on those streams. This can be done by using the time slice identifier descriptor. The descriptor can be used at least in Network Information Table (NIT), Program Map Table (PMT) and IP/MAC Notification Table (INT) tables. Each table provides information in the following levels:

NIT—Descriptor is used to provide information per each transport steam (i.e. all applicable elementary streams within the transport stream are time sliced).

PMT—Descriptor is used to provide information per each elementary stream carrying on or more IP/MAC stream.

INT—Descriptor is used to provide information per each elementary stream carrying one or more IP/MAC stream.

It is noted that the SI and/or possibly the SI table(s) in this connection comprise the PSI and PSI table(s) also. Preferably, the SI/PSI tables contain the time slice identifier descriptor, and they are delivered to the receiver. The time slice identifier descriptor can be referred to as time_slice_identifier_descriptor in the technical specifications.

Some embodiments of the invention apply the time slice data transmission principle in DVB. In the following a short introduction on the embodied time slicing in DVB is provided. The current DVB-T receivers (including both radio frequency and baseband parts) can be considered consuming too much power to be integrated into mobile convergence terminals. The power consumption is with current "state-of-the-art-technology" roughly 2.5 W. In mobile handheld terminals however the average power consumption of any additional receivers should preferably be less than 250 mW. This is not only because of the limited battery capacity but also because of the extremely challenging thermal dissipation in miniaturized environment. Therefore, an approximate power reduction of 80-90% is needed to be able to use DVB-T receiver in a mobile terminal. An increase in the function integration level of the DVB-T relieves this problem partly.

Usually the services used in mobile terminals are by nature based on quite low bit rate transmission. Most often the maximum bit rate is in the order of 350 kbits/s. The DVB-T transmission system provides even with mobile compatible modulation parameter selection up to 12 Mbits/s bit rate. This provides a possibility to dramatically reduce the average DVB-T receiver power consumption by introducing time division multiplexing (TDM), which is called here time slicing because the active and inactive periods are much longer than in traditional TDM. The principal idea is to send information in bursts utilizing significant part (or all) of the DVB-T transmission channel bandwidth. For example, different neighbouring bursts relate to a different service, and bursts are transmitted cyclically. Such a transmission does not necessary have to be discontinuous, as the case in TDM typically is, but a continuous transmission is applicable in such a way that reception focus is on the relevant portion of the transmission or there is a strong emphasize on the relevant portion of the transmission even though the transmission is continuous. This enables receiver to be active only small part of the time and still provide constant lower bit rate by buffering the received bursts. Thus, the time slicing applies TDM principle and turn at least partly off the receiver when it is not used. Preferably, the time slicing is applied for streaming and other continuous parallel IP data services. IP data is transmitted as bursts utilizing significant part (or all) of the DVB-T transmission channel bandwidth. Time interval between two bursts relating to the same service is depending on the used bit rate. The receiver is functionally on during the relevant bursts of the reception and at least partly off otherwise.

The time slicing system is introduced to improve terminal performance, mainly to lower power consumption. The time slicing system can, therefore, be optimised from terminal point of view so that the implementation is optimal for the terminal. The transmitter side can be more complex to implement. This selection is justified because the number of terminals is much bigger than the number of transmitters. The DVB-T system is broadcast type (from one to many). Therefore, the number of transmitters is quite small. Also, the implementation cost in transmitter side is less critical compared to terminal implementation. Advantageously, in a case where time sliced stream is transmitted over DVB, the time sliced stream can be identified by the time slice identifier descriptor. Therefore, the time sliced streams can be identified from any other non-time sliced streams. In addition, the descriptor can provide more information on the stream and the service it contains and relates to.

Still referring to the time slice embodiment, transmitted service is split into bursts on the transmitter side. Low bit rate service (e.g. streaming video) is transmitted with high bit rate bursts using the whole capacity of the DVB-T channel. This enables sending the same amount of data in shorter time than with continuous system. Receiver can be ON only during the burst of the received service.

Transmitter provides system clock information also for the receiver for example by sending clock stamps. With this system transmitter and receiver are always roughly time-synchronised.

Transmitter uses the relative clock to indicate the timing of the bursts. The transmitter sends with some protocol information about for example the start, stop, duration and ON/OFF interval of the burst. All timing information is relative in relation to the start of burst, not absolute. The terminal uses this information for setting the DVB-T receiver ON and OFF. Transmitter has to buffer at least two bursts before sending the first one so that relative timing information (Interval) can be inserted in the frame information.

Still referring to the time slice embodiment, the transmitter generates the required timing information. The information should be added to the sent info just before the transmission or the delay between timing info insertion and real transmission should be fixed or predictable.

The timing info can inserted for example to: 1) DVB-MPE (Multiprotocol Encapsulation) frames or other DVB data, 2) IP packets, 3) Modulation data like TPS (transmitter parameter signalling) in DVB-T.

Terminal extracts the tiring information and switches the receiver ON slightly before the burst is transmitted. This gives time for the receiver to synchronise to the incoming stream before the useful data burst is received.

General low accuracy (±1 s) clock can be extracted from standard either to the following SI tables; Time and Date Table or Time Offset Table. This clock info is used to initiate the reception. It is also used for SFDL (scheduled file download).

For time slicing a relative timing information should be provided. Both the transmitter and receiver have their independent clocks, but it is assumed that the relative accuracy of these clocks is good enough. In practise relative timing info could be sent for example in MPE frames with resolution of e.g. 10 ms. Transmitter signals the beginning of next burst in relation to the current burst. Terminal uses its OWN real time clock to sleep (receiver OFF) until the next burst comes.

The example of FIG. 1 shows the digital broadband transmission and reception principle for such a transmission in accordance with an embodiment of the invention. The example depicts the time slice data broadband transmission, and shows how the different services are divided in a diagram 100. It also shows a reception power diagram 101 depicting when the receiver should be ON and OFF in such a way that appropriate service can be received in accordance with the power saving principle. The example of FIG. 1 has four services to be transmitted. The receiver wishes to receive the service 3 and accordingly the receiver power ON/OFF timing is adjusted in such a way that the receiver is substantially ON during those points in time when the service 3 is transmitted and substantially OFF otherwise for saving/reducing the power consumption of the receiver.

Some embodiments of the applied transfer protocol in the invention are based on the methods and systems presented in a specification ISO/IEC 13818-1 Information Technology—Generic Coding of Moving Picture and Associated Audio Information: Systems on pages viii-xii, incorporated herein as a reference. The ISO/IEC 13818-1 defines a Transport Stream (TS) which forms a basis for the service delivery and for the DVB.

Figure 2:
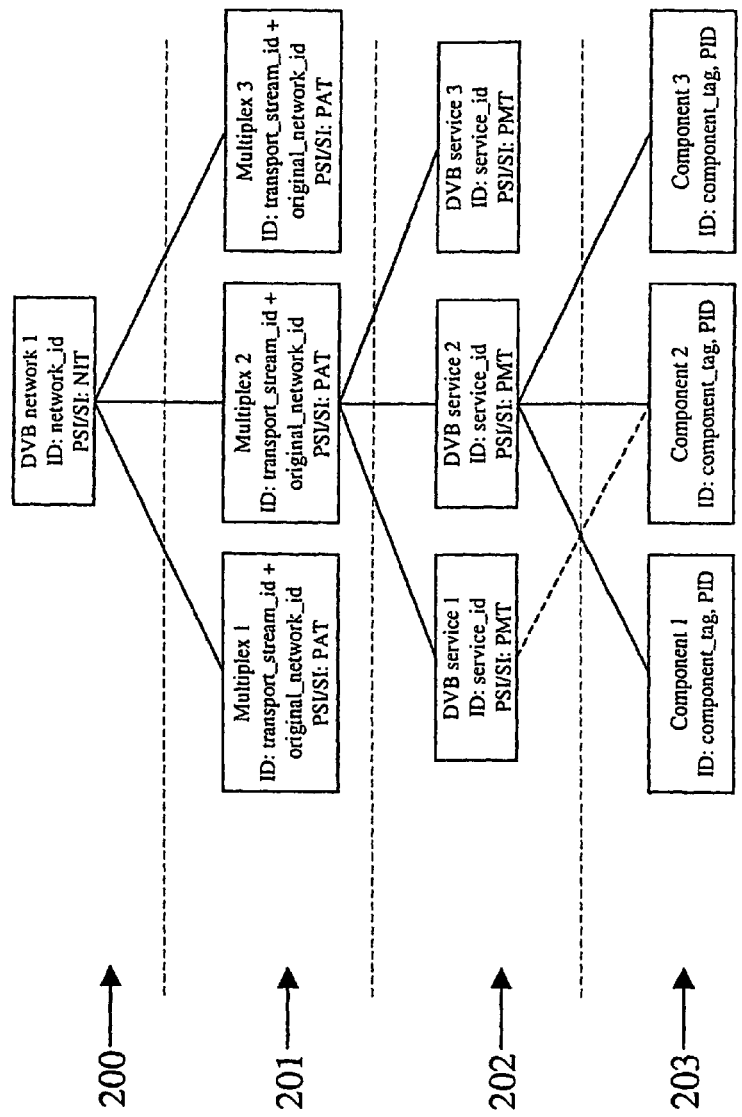
FIG. 2 shows an example of a relation between a DVB network, Transport Streams (TS)s, DVB service and components, in which the principles of an embodied invention can be applied.

Some embodiments of the invention apply the elementary stream (ES). FIG. 2 shows an example of a relation between DVB network (200), Transport Streams (TS)s (201), DVB service (202) and elementary Streams (ES)s (203) containing components. A component can define a portion of the service and, preferable contains parameters for the reception of the service or a portion of the service. A component is typically identified by component_tag. Component_tag is unique within a DVB service. The component is carried within the Elementary Stream (ES), identified by a Program Identifier (PID). PID is unique within a TS. Mapping between component_tag and PID is signalled in a Program Map Table (PMT). It is possible to have one ES carrying component of more than one DVB service, as illustrated by a dash line in FIG. 2. Advantageously, various ESs can be identified by the time slice identifier descriptor, and in addition the time slice descriptor can provide additional information about the transmitted elementary streams. The time slice identifier descriptor is contained in the SI/PSI tables.

Typically, IP streams comprises IP datagrams. For conveying IP over DVB, a preferable solution is Multiprotocol Encapsulation (MPE). The MPE operates in conjunction with the INT table specified by DVB specifications.

Some embodiments of the invention apply the INT table(s). IP/MAC Notification Table (INT) is used to signal the availability and location of IP streams in DVB networks. INT describes the availability and location of IP streams. There may be one or many INTs covering all IP streams for a DVB network. INT is referenced by, for example, the data_broadcast_id_descriptor 0x000B, in the ES_info loop of the PMT. Each IP platform having IP streams available within a TS, is announced in exactly one INT sub_table in the TS. INT announces all IP streams available within the actual TS. LNT may announce IP streams on other TSs. INT should announce all IP streams on all TSs of the DVB network that a Receiver has access (by re-tuning), while having access to the TS containing the INT (i.e. DVB signals that have overlapping or adjacent coverage area). Advantageously, the time slice identifier descriptor can be referred to in the INT table, and the descriptor is used to provide information per each elementary stream carrying one or more IP/MAC stream.

Still referring to the INT embodiments and further to the usage of the time slice identifier descriptor in INT table. Time slice identifier descriptor can be located in the platform loop and the operational loop of the INT.

In case the time slice identifier descriptor is in the platform_ loop, it applies to all ESs announced within the whole INT sub_table In case the time slice identifier descriptor is in the operational_loop, it applies to all ESs announced within the loop (operational_loop).

By adding the descriptor in the first loop, it applies to all ESs within the sub_table, and therefore is required only once. Advantageously, the appliance of the time slice descriptor in the INT optimises the usage of bandwidth. If most ESs are time sliced, and only very few (if any) are not, this would optimise the usage of bandwidth significantly. Even in case all ESs are time sliced, adding the descriptor in INT optimises bandwidth usage, since INT is typically re-transmitted less often than all the other PSI tables. Syntax for the time slice identifier descriptor is shown in an example of Table 1.

Some embodiments of the invention apply the time slice identifier descriptor. A table 1 provides an example of time slice identifier descriptor table.

TABLE 1

| Name | Size (bits) | Unit/Typ | Default value |
| --- | --- | --- | --- |
| time slice identifier descriptor | | | |
| descriptor tag | 8 | uimsbf | TBD |
| descriptor length | 8 | uimsbf | |
| Time slicing version | 2 | uimsbf | |
| Max burst duration | 3 | uimsbf | |
| Service size within burst | 3 | uimsbf | |
| Delta t jitter | 3 | uimsbf | |
| Delta-t factor | 2 | uimsbf | |
| reserved future use | 3 | bslbf | |
| } | | | |

The time slice identifier descriptor has five fields that are applied for providing information of the time sliced IP streams. Time slice identifier descriptor can be placed or referred to at least in the following PSI/SI tables: PMT, NIT and INT. Time slice identifier descriptor can contain the following fields descriptor_tag (a general descriptor field), descriptor_length (a general descriptor field), time_slicing_version, max_burst_duration, service_size_within_burst, delta_t_jitter, and delta_t_factor. In the following more detailed examples of the fields of the time slice identifier descriptor are provided.

time_slicing_version: Specifies the version of time slicing used. A certain version number, for example '00', can be reserved to indicate that the referred ES is not time sliced, in which case following fields shall be ignored. Advantageously, the appliance of the version ID enables to deliver many different versions of the time slice standard to the same network: Also, when considered at the time slice MPE level and at TS level at the same time.

max_burst_duration: Indicates the maximum burst duration. An underlying table 2 provides an example of coding of the max_burst_duration.

TABLE 2

| max_burst_duration | Description |
| --- | --- |
| 000 | 100 ms |
| 001 | 200 ms |
| 010 | 400 ms |
| 011 | 600 ms |
| 100 | 800 ms |
| 101 | 1500 ms |
| 110 | 2000 ms |
| 111 | more than 2000 ms |

This comprises a static time-out value. Advantageously, if the last data of the burst is lost for some reasons, the receiver is still able to rest (and save the power) in this case. Based on information on burst maximum duration, the receiver can estimate the reception period and can rest so that the data reception is not interfered even if the burst is lost.

service_size_within_burst: Specifies the maximum number of bits per service session within a burst. In case only one service session is carried within ES, this is the maximum size of a burst within the ES. In case multiple service sessions are carried within ES, the size of a burst may be greater than value specified. An underlying table 3 provides an example of coding of maximum service size within burst.

TABLE 3

| service_size_within_burst | Description |
| --- | --- |
| 000 | 62 000 |
| 001 | 125 000 |
| 010 | 250 000 |
| 011 | 500 000 |
| 100 | 1 000 000 |
| 101 | 2 000 000 |
| 110 | 4 000 000 |
| 111 | more than 4 000 000 |

An object of the burst size per session is to limit the size of the burst per session. Advantageously, the appliance of the burst size per session enables that within an elementary stream the IP streams are time sliced. Typically, the receiver (and the appliance) is interested in sessions. Another benefit is that as the receiver pertains interest to the sessions, it can optimise (or reduce) the memory usage explicitly based on the sessions. The transmitter operates the transmission in such a way that the bursts are made elementary stream-specific. The transmitter looks after that even a single session does not apply more than the predefined amount of bytes of the bursts. When receiver receives such a transmission, the receiver sees that the bursts are formed from the sessions.

Thus, the size of the bursts processed by the transmitter are different than those seen by the receiver. Benefits of the appliance of the burst size per session are that the receiver can process bigger data entities (many sessions/bursts) better, the memory usage of the receiver is reduced and information on the applicable size of the memory is obtained, based on which the available memory comes closer to optimum usage, and the appliance scale of time slice on/off times is enlarged.

Thus, the appliance of the sessions to limit the size of the burst seen by the receiver can be provided.

Delta_t_jitter: The time slice identifier descriptor can also have a field for indicating Delta-t offset parameter Delta_t_jitter. Preferably, the Delta-T parameter indicates the time when the receiver should be off to the next relevant burst in the time sliced digital broadband transmission. Thus, off-time to the next relevant burst can be signalled to the receiver by the Delta-T parameter. An accuracy of Delta-T should be indicated to the receiver. For example, ±10 ms or ±20 ms from a theoretical or currently applied use. Also this can indicate a certain unit or that other unit than current one or running one is applied. Preferably, the parameter for this is referred to as Delta t jitter. The parameter specifies the output tolerance of the MPE bursts in the transmitters. It can be used by the IRD to correct Delta-t value given in the MPE header of each burst. The parameter provides information how transmission time accuracy effect to the transmission of the next burst. Delta T is indicated per a burst. An underlying table 4 provides an example of coding of the Delta t jitter.

TABLE 4

| Delta-t jitter (+/−) | Description |
| --- | --- |
| 000 | less than 5 ms |
| 001 | less than 10 ms |
| 010 | less than 20 ms |
| 011 | less than 40 ms |
| 100 | less than 60 ms |
| 101 | less than 80 ms |
| 110 | less than 100 ms |
| 111 | Reserved for future use |

Delta_t_factor: Specifies the value with which the delta-t has to be multiplied. For example, if the delta-t value read from the burst is 10 ms and the factor is 2, the time to the next burst is 10*2=20 ms. Typically, specified value for factor is 1, but other values may be applied. An underlying table 5 provides an example of coding of the Delta t factor.

TABLE 5

| Delta-t factor | Description |
| --- | --- |
| 00 | 1 |
| 01 | reserved for future use |
| 10 | reserved for future use |
| 11 | reserved for future use |

Figure 3:
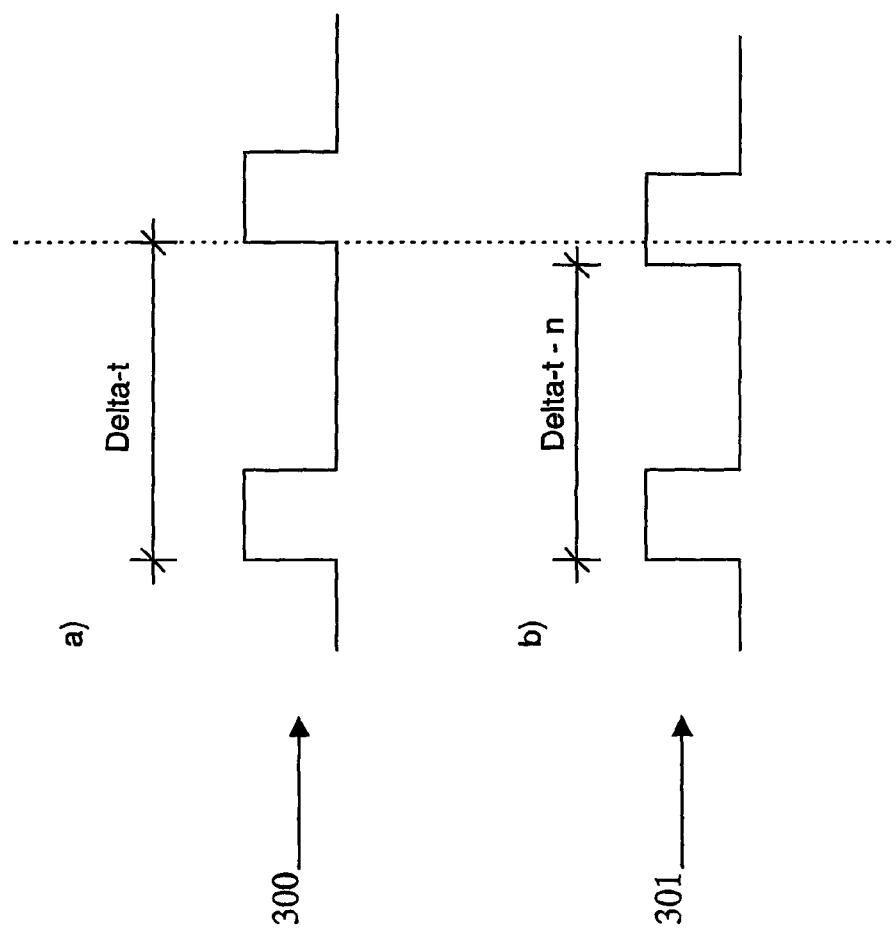
FIG. 3 illustrates an example of the appliance of the Delta-t Jitter in a further embodiment of the invention.

FIG. 3 illustrates an example of the appliance of the Delta-t jitter in a further embodied invention. The example of FIG. 3 illustrates the transmission of two bursts (burst 300 and burst 301), where reference a) indicates the information of the delta-t set in the MPE header prior to the transmission. Furthermore, reference b) indicates the jitter occurring in the actual transmission, wherein Delta-t jitter is indicated as n. Thus, IRD may be prepared to this jitter error, if Operator (alternatively referred to as the transmitter) is aware of the Delta-t jitter (±) occurring in each transmission and announces it in the time_slice_identifier_descriptor in the Delta_t_jitter field.

Some embodiments of the invention apply NIT. NIT conveys information relating to the physical organization of the multiplexes/TSs within a given DVB network, and the characteristics of the DVB network itself. More detail on NIT can be found from a standard specification EN 300 468 (2000-11) on page 16. When the time slice identifier descriptor is applied in NIT, the time slice identifier descriptor is used to provide information per each transport steam, for example, all applicable elementary streams within the transport stream are time sliced. Time slice identifier descriptor can be located in transport stream loop of NIT. More details on the transport stream loop of NIT can be found from the standard specification EN 300 468 on page 16 in table 3. When the time slice identifier descriptor is applied in NIT, the time slice identifier descriptor maps each transport stream with the information that the time slice identifier descriptor contains.

Some embodiments of the invention apply PMT. Each PMT literally maps out a specific program, listing the PID values for the packets containing the program's video, audio and data components. With this information, the decoder can easily discover, decode and display the program's content. The specification ISO/IEC 13818-1 Information Technology—Generic Coding of Moving Picture and Associated Audio Information: Systems provides some more technical details on PMT on page 44. Advantageously, time slice identifier descriptor is used to provide information per each elementary stream when used in PMT. In further examples, the usage of the time slice identifier descriptor in PMT table can be the following. Time slice identifier descriptor can be located in the second loop of PMT. The second loop of PMT is referred to in ISO/IEC 13818-1 on page 44 in table 2-28. When the time slice identifier descriptor is applied in PMT, it maps each elementary stream, with the information that the time slice identifier descriptor contains.

Figure 4:
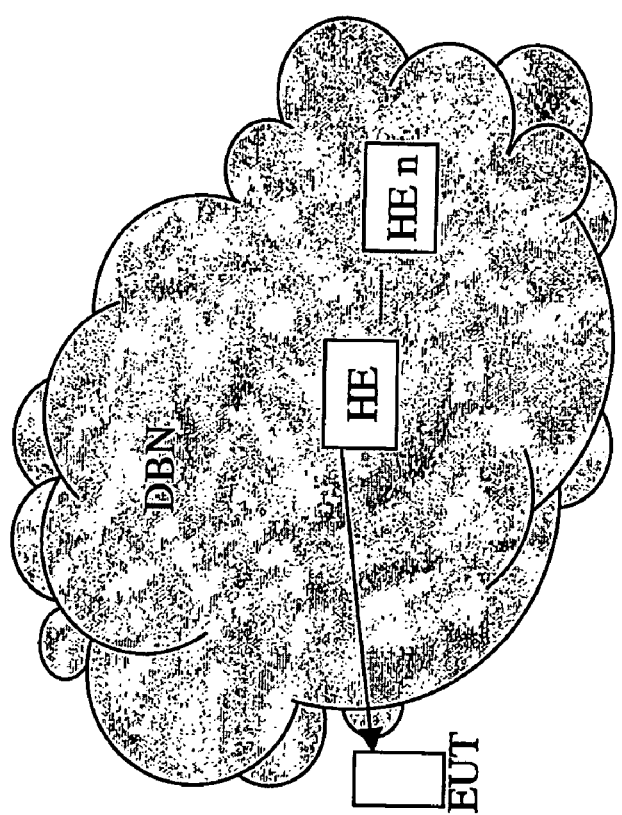
FIG. 4 shows a general architecture of the system where principles of an embodied invention can be applied.

FIG. 4 has been described in the foregoing. In the following, corresponding reference signs have been applied to corresponding parts. Some embodiments of the invention apply the system of FIG. 4. A End User Terminal (EUT) operates preferably under coverage of a digital broadcast network (DBN). EUT can be capable of receiving IP based services that the DBN is providing. The DBN is based on DVB, and the transmission of the DBN contains elementary streams (ES)s. The transmission may also be based on the time sliced and non-time sliced transmission. Before transmission data is processed in the DBN. The DBN comprises means for modifying the transmission that it is transmitting. The DBN provides the time slice identifier descriptor as described above, for example, in the example of table 1. The EUT can obtain the time slice identifier descriptor from the transmission and receive the time sliced streams. Therefore, the EUT can identify time sliced and non-time sliced elementary streams from the transmission. In addition, based on the time slice identifier descriptor the EUT can have more information on the transmitted elementary streams. The EUT does not necessary need beforehand modification to such descriptor and such transmission but they can be taken care of while receiving the broadcast transmission. The EUT does not require any interaction for identifying the time sliced and non-time sliced elementary streams. Preferably, the DBN transmission is wireless or mobile transmission to the EUT based on DVB-T. Thus, data can be transferred wirelessly.

Still referring to the example of FIG. 4, headends (HE)s containing IP encapsulators perform a multi-protocol encapsulation (MPE) and places the IP data into Moving Picture Experts Group-Transport Stream (MPEG-TS) based data containers. The HEs perform the generation of the tables, the linking of the tables and the modification of the tables.

According to some embodiments, the operation of the IP encapsulators may involve placing the received data into UDP packets, which are encapsulated within IP packets, which are in turn encapsulated into DVB packets. Details of this multi-protocol encapsulation technique may be found, for example, in standard document EN 301 192, incorporated herein as a reference. At the application layer, usable protocols include, for example UHTTP (unidirectional HTTP), RTSP (Real-Time Streaming Protocol), RTP (Real-time Transport Protocol), SAP/SDP (Service Announcement Protocol/Service Description Protocol) and FTP.

In certain further embodiments, IP encapsulation may make use of IPSEC (Internet Protocol Security) to ensure that content will only be usable by receivers with the appropriate credentials. During the encapsulation process, a unique identifier may be added to at least one of the headers. For example, when UHTTP is used, the unique identifier may be encoded in the UHTTP header under the UUID field. Therefore in certain embodiments, to cater for the delivery of data to a particular terminal or group of terminals, the containers may also hold address information which can be identified and read by a conditional access component in the receiver to determine whether the data is intended for that terminal. Alternatively, to cater for the delivery of data to a plurality of terminals multicast can be applied, and advantageously single sender can reach multiple receivers. A Virtual Private Network (VPN) can also be formed in the system of the DBN, and the receiver. A certain bandwidth of the DBN broadcasting is allocated to a point-to-point or point-to-multipoint communication from the DBN to the receiver. The DBN may also have various transmission channels for other streams running. The receiver performs a multi-protocol decapsulation to form the IP data packets.

The DVB packets so produced are transmitted over the DVB data link. The EUT receives digitally broadcast data. The EUT receives the time slice identifier descriptor and also the time sliced elementary streams and non-time sliced elementary streams. The EUT is able to identify the time sliced elementary streams and non-time sliced elementary streams based on the descriptor, and in addition the EUT can obtain more information on the transmitted time sliced elementary streams from the descriptor. Therefore, the EUT can discover services or even certain sessions of a service, categorise and focus on the time sliced streams, if necessary, realise which streams are non-time sliced and obtain information on the time sliced streams and their functions and properties. The EUT is capable of providing the service or a portion of the service to user. When a transmission rate is specified by the caster, that rate is adhered to.

Figure 5:
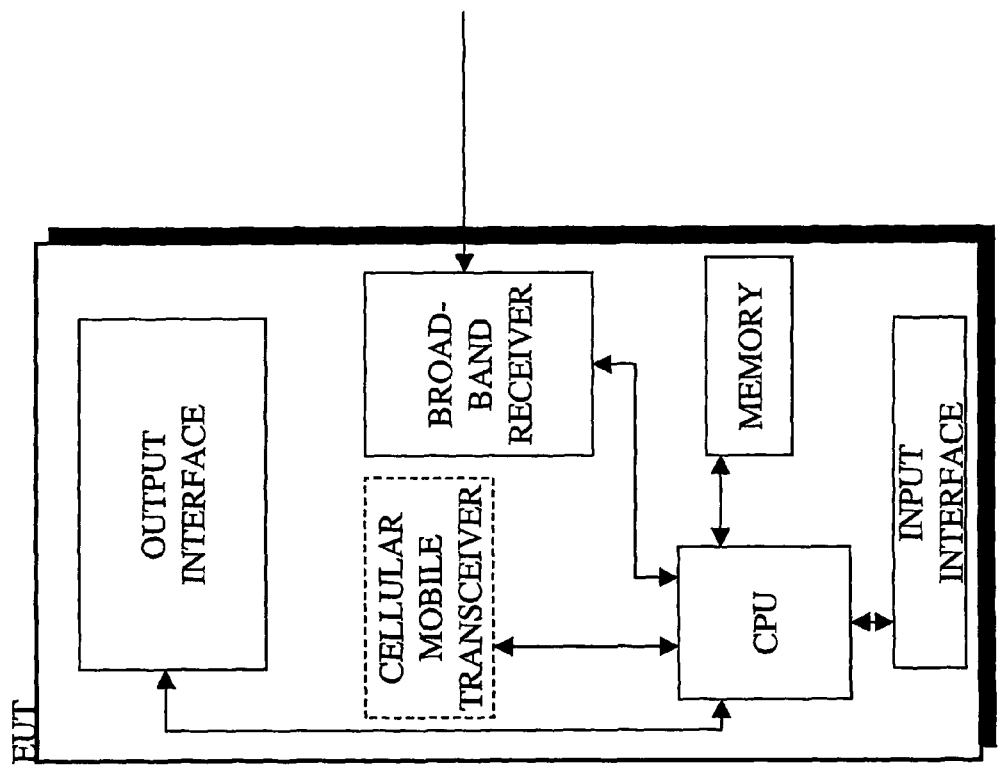
FIG. 5 depicts a functional block diagram of a terminal for identifying time sliced elementary streams and for providing additional information on the received elementary streams in accordance with an embodiment of the invention.

FIG. 5 has been described in the foregoing. In the following, corresponding reference signs have been applied to corresponding parts. An example of FIG. 5 depicts a functional block diagram of a End User Terminal (EUT) or alternatively referred to as a receiver. The EUT of FIG. 5 may be used in any/all of the above example(s). The EUT comprises a processing unit CPU, a broadband receiver part or alternatively referred to as a multi-carrier signal receiver part, which can receive, for example, a multi-carrier broadband signal such as DVB-T signal, and a user interface UI. The broadband receiver part and the user interface UI are coupled with the processing unit CPU. The user interface UI comprises a display and a keyboard to enable a user to use the receiver. In addition, the user interface UI comprises a microphone and a speaker for receiving and producing audio signals. The user interface UI may also comprise voice recognition (not shown). The processing unit CPU comprises a microprocessor (not shown), memory and possibly software SW (not shown). The software SW can be stored in the memory. The microprocessor controls, on the basis of the software SW, the operation of the receiver, such as the receiving of the elementary stream, the identification of the elementary stream based on the time slice identifier descriptor, displaying output in the user interface UI and the reading of inputs received from the user interface UI. The operations are described in the examples of FIGS. 1-4, 6-8 and tables 1-5. For example, the hardware (not shown) comprises means for detecting the signal, means for demodulation, means for detecting the time slice identifier descriptor, means for discover elementary streams, means for identifying those elementary streams which are time sliced and those which are not, means for applying time slicing in the reception, means for reading information for elementary streams from the descriptor. Moreover, CPU can control the availability of the memory of the EUT. This availability is time to time (or it is defined based on the scheduled transmission of services) checked by the CPU and compared with the information of the maximum size of service included in burst in order to make the decision to switch the receiver ON or keep the receiver ON. Advantageously, the memory of the EUT can be reduced by the comparison.

Still referring to FIG. 5, alternatively, middleware or software implementation can be applied (not shown). The EUT can be a hand-held device which the user can comfortably carry. Advantageously, EUT can be a cellular mobile phone which comprises the broadcast receiver or multi-carrier signal receiver part for receiving the DVB-T broadcast transmission streams (this is shown in the FIG. 5 by a dash line block which, thus, is an alternative option only). Therefore, the EUT may possibly interact with the service providers.

Figure 6:
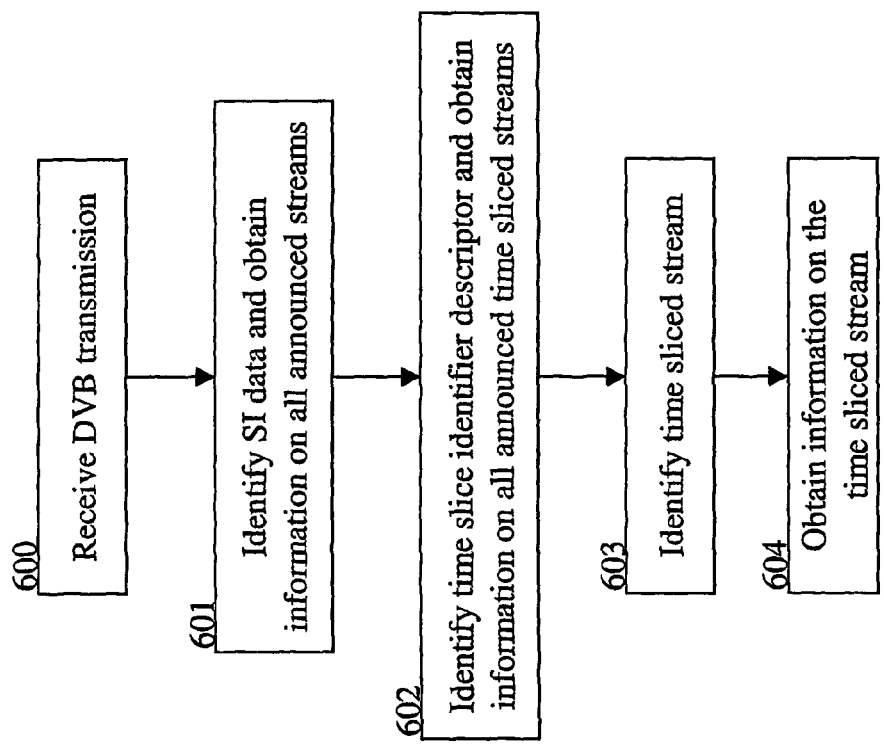
FIG. 6 depicts in a form of a flowchart a method for identifying time sliced elementary streams and for providing additional information on the received elementary streams in accordance with an embodiment of the invention.

The example of FIG. 6 depicts a method in a form of a flowchart for identifying time sliced elementary streams. In step 600 the DBN is operating and the EUT is switched on for receiving the broadcast transmission. In step 601 the EUT identifies the SI/PSI tables and also the EUT obtains information on all the announced streams. The time slice identifier descriptor is contained in the SI/PSI tables and, consequently, the EUT discovers the descriptor in step 602. Moreover, the EUT obtains information on all announced time sliced streams. The examples of the descriptor is described above in the examples of tables 1-5. The EUT receives also the elementary streams of the broadband transmission of the DBN. Based on the descriptor the EUT is able to separate or categorise the streams for time sliced and non-time slices streams (step 603). Especially, the EUT can discover those elementary streams that are transmitted under the time slicing principle. The EUT can apply time slicing power reduction principle in the broadcast reception. In addition, the descriptor provides the EUT with additional information on the received elementary streams that are time sliced (step 604). The examples of the provided information are described in the examples of tables 2-5 and FIGS. 1-5.

Figure 7:
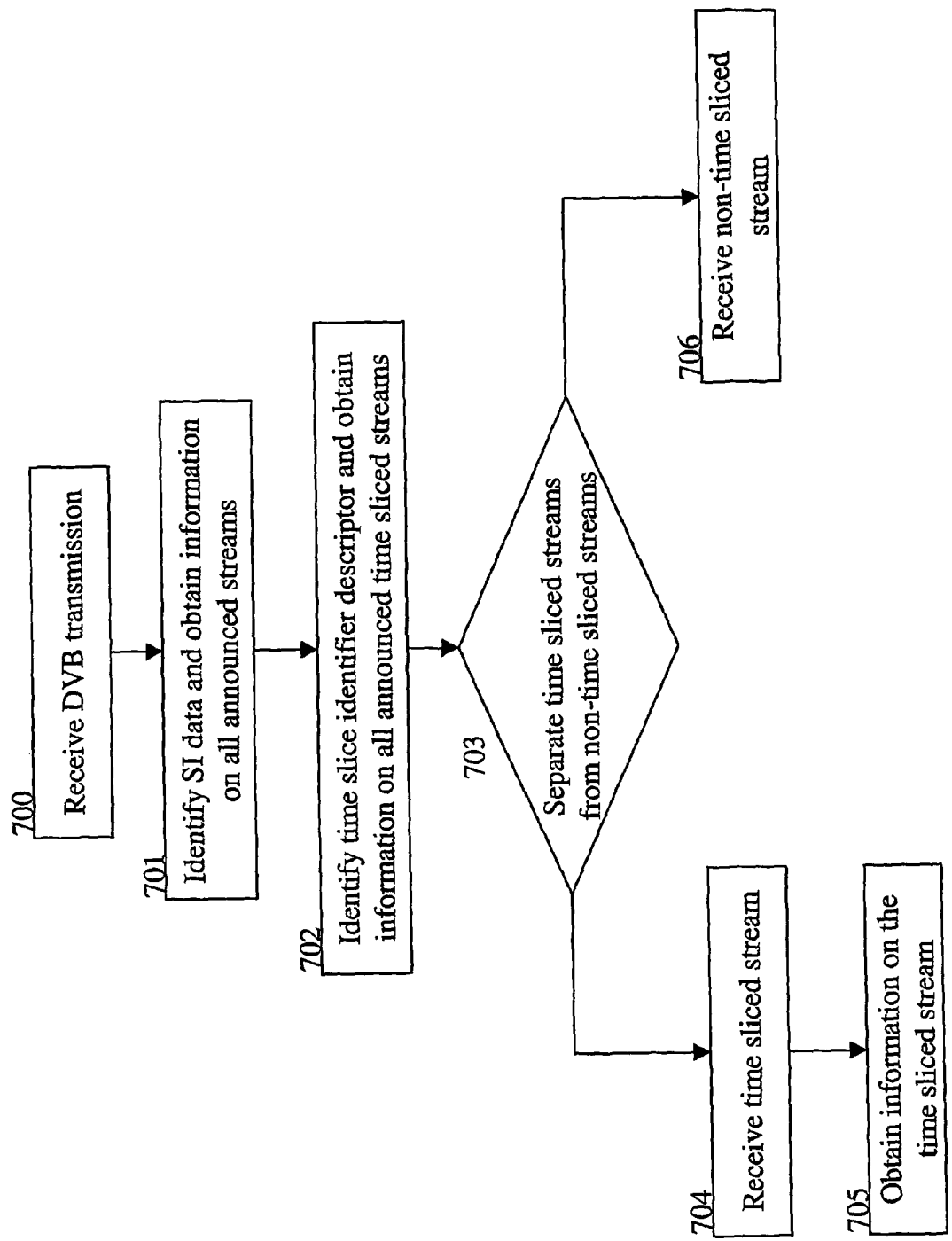
FIG. 7 depicts in a form of a flowchart a method for separating time sliced elementary streams from non-time sliced elementary streams in accordance with an embodiment of the invention.

The example of FIG. 7 depicts a method in a form of a flowchart for separating time sliced elementary streams. In step 700 the DBN is operating and the EUT is switched on for receiving the broadcast transmission. In step 701 the EUT identifies the SI/PSI tables, and the EUT obtain information on all announced streams. The time slice identifier descriptor is contained in the SI/PSI tables and, consequently, the EUT discovers the descriptor in step 702, and the EUT obtains also information on all announced time sliced streams. The examples of the descriptor is described above in the examples of tables 1-5. The EUT receives also the elementary streams of the broadband transmission of the DBN. Based on the descriptor the EUT is able to separate the streams for time sliced and non-time slices streams (step 703). Especially, the EUT can discover those elementary streams that are transmitted under the time slicing principle. The EUT can apply time slicing power reduction principle in the broadcast reception (step 704). In addition, the descriptor provides the EUT with additional information on the received elementary streams that are time sliced (step 705). The examples of the provided information are described in the examples of tables 2-5 and FIGS. 1-5. Also optionally the EUT may receive non-time sliced stream (step 706).

Figure 8:
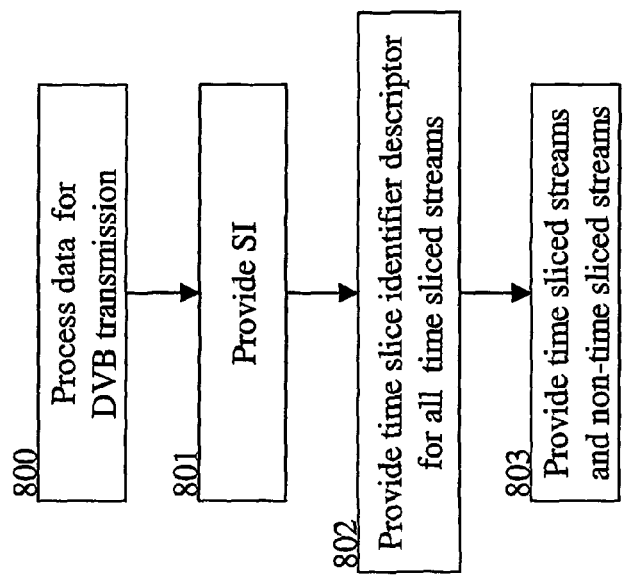
FIG. 8 depicts in a form of a flowchart a method for categorising transmitted DVB streams in accordance with an embodiment of the invention.

The example of FIG. 8 depicts a method in a form of a flowchart for categorising DVB transmitted streams. In step 800 the DBN is operating and process service data for DVB transmission. In step 801 the DBN provides the SI/PSI data in the transmission. The time slice identifier descriptor is contained in the SI/PSI tables and, consequently, the time slice identifier descriptor is provided in the transmission for all the time sliced streams in step 802. The examples of the descriptor is described above in the examples of tables 1-5. The DBN transmits also the time sliced streams and possibly non-time sliced streams in step 803. Based on the descriptor the DBN is able to categorise the streams for time sliced and non-time slices streams. Especially, that the EUT can discover those elementary streams that are transmitted under the time slicing principle. The EUT can apply time slicing power reduction principle in the broadcast reception. In addition, the descriptor provides the EUT with additional information on the received elementary streams that are time sliced. The examples of the provided information are described in the examples of tables 1-5 and FIGS. 1-5.

Some embodiments of the invention are implemented in the network system of FIG. 4 operating the method referred to above in the examples of FIGS. 1-3 and 5-8. Moreover, the invention can be embodied at the receiver device of FIG. 5 operating the above examples of FIG. 1-4 and 6-8. The receiver can beneficially focus on those streams of the DVB transmission to which the receiver can apply the power reduction principle. Thus, there can be a significant reduction of power in the operation of the receiver, which contribute the mobility aspect of the DVB receiver. The receiver only needs to be able to interpret defined descriptor by applying equivalent means as it is used to receive and identify other descriptors of the digital broadcasting. Some embodiments of the invention supports portable reception in IP datacast receivers, and can, possibly, work for mobile hand held receivers. The performance of the embodiments boosts benefits of the invention such as economy. For example, DVB-T offers an effective and cheap way to distribute data, and the embodiments promote the less power consumption reception way for broadcast data stream even when operating along with non-power consumption based broadcast system.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims. Consequently, the options of implementing the invention as determined by the claims, including the equivalents, also belong to the scope of the present invention.

The invention claimed is:

1. A method comprising:
   receiving bursts of a digital broadband broadcast transmission at a first bit rate, said bursts providing information and utilizing at least a part of a channel bandwidth, wherein at least one of said bursts comprises data of a service that is based on a second bit rate smaller than the first bit rate,
   receiving, within the digital broadband broadcast transmission, a descriptor configured to identify at least one of said bursts and further configured to identify additional information stored in at least one of the following: a network information table, program map table and an IP/MAC notification table,
   detecting said at least one burst based on the descriptor, and
   switching power to at least part of a receiver in accordance with said at least one burst.

2. A method according to claim 1, wherein the detecting further comprises separating the digital broadband broadcast transmission based on the descriptor into first parts fit to save power in the receiver and second parts not fit to save power in the receiver.

3. A method according to claim 1, wherein at least one of said bursts comprises a time sliced elementary stream, and said method further comprises identifying at least one time sliced elementary stream.

4. A method according to claim 1, wherein the descriptor comprises information on a size of a service session contained in said at least one burst of the digital broadband broadcast transmission, and said method further comprises:
   comparing available memory in the receiver to said size, and
   switching at least part of the receiver on or off based on a result obtained in said comparison.

5. A method according to claim 1, wherein the switching comprises
   switching the receiver functionally on during relevant bursts of the digital broadband broadcast transmission relating to a uniform data concept, and
   switching the receiver at least partly off otherwise.

6. A method according to claim 1, wherein the digital broadband broadcast transmission is sent at least partly in accordance with a principle wherein the receiver is functionally on during cyclical relevant bursts of the digital broadband broadcast transmission relating to a same service and at least partly off otherwise.

7. A method according to claim 1, wherein said at least one of said bursts comprise at least one of elementary streams of the digital broadband broadcast transmission and transport streams referred to in the network information table.

8. A method according to claim 1, wherein the digital broadband broadcast transmission at least partly comprises a time slice data broadband broadcast transmission.

9. A method according to claim 1, wherein the descriptor is configured to specify maximum number of bits per a service session that the digital broadband broadcast transmission is providing within a burst of the digital broadband broadcast transmission.

10. A method according to claim 9, wherein IP data streams contained in at least one elementary stream are transmitted in accordance with time slicing broadband transmission.

11. A method according to claim 9, wherein the receiver is configured to fit a memory usage of the receiver in accordance with the service session.

12. A method according to claim 1, wherein the method further comprises limiting a size of said at least one burst of the digital broadband broadcast transmission per a service session of the digital broadband broadcast transmission.

13. A method according to claim 1, wherein the descriptor comprises an indication of a maximum burst duration.

14. A method according to claim 13, wherein said switching is applicable, if a remainder of said at least one burst is lost.

15. A method according to claim 1, wherein the descriptor is configured to indicate a version of a time slice data broadband transmission.

16. A method according to claim 1, wherein the descriptor is configured to indicate that an elementary stream contained within transport stream is not transmitted in accordance with time slice data broadband transmission of the digital broadband broadcast transmission.

17. A method according to claim 15, wherein a broadband network providing the digital broadband broadcast transmission is adapted to operate at multiprotocol encapsulation level and transmission stream level simultaneously with different versions of the time slice data broadband transmission.

18. A method according to claim 1, wherein the descriptor is configured to indicate, to the receiver, a tolerance for a timing for a reception of said at least one burst of the digital broadband broadcast transmission.

19. A method according to claim 1, wherein the descriptor is received in SI/PSI tables of the digital broadband broadcast transmission.

20. A method according to claim 19, wherein the descriptor is received in the network information table for providing information per each transport stream of the digital broadband broadcast transmission.

21. A method according to claim 19, wherein the descriptor is received in a program map table for providing information per each elementary stream.

22. A method according to claim 19, wherein the descriptor is received in a IP/MAC notification table for providing information per each elementary stream carrying at least one IP/MAC stream of the digital broadband broadcast transmission.

23. A method according to claim 22, wherein the descriptor is contained in the IP/MAC notification table for reducing a bandwidth of the digital broadband broadcast transmission.

24. A method according to claim 1, wherein the digital broadband broadcast transmission comprises a multi-carrier signal transmission.

25. A method according to claim 1, wherein the digital broadband broadcast transmission comprises digital video broadcasting transmission.

26. A method according to claim 25, wherein the digital video broadcasting transmission comprises a terrestrial digital video broadcasting transmission.

27. A method according to claim 1, wherein the digital broadband broadcast transmission comprises a wireless digital broadband broadcast transmission.

28. A method comprising:
transmitting bursts of a digital broadband broadcast transmission at a first bit rate, said bursts providing information and utilizing at least a part of a channel bandwidth, wherein at least one of said bursts comprises data of a service that is based on a second bit rate smaller than the first bit rate; and
transmitting, as part of the digital broadband broadcast transmission, a descriptor configured to identify at least one of said bursts and further configured to identify additional information stored in at least one of the following: a network information table, program map table and an IP/MAC notification table.

29. A method according to claim 28, wherein at least one of said bursts comprises a time sliced elementary stream, the descriptor is configured to enable a receiver to identify the time sliced elementary stream from a non-time sliced elementary stream.

30. A method according to claim 28, wherein consecutive bursts are configured to relate to a different service.

31. A method according to claim 28, wherein bursts are configured to be transmitted sequentially so that bursts within a sequence comprises data of a different service.

32. A method according to claim 28, wherein at least one of said bursts comprises an elementary stream of the digital broadband broadcast transmission or a transport stream referred to in the network information table.

33. A method according to claim 28, wherein said digital broadband broadcast transmission at least partly comprises a time slice data broadband transmission.

34. A data processing system comprising circuitry configured to perform steps of the method according to claim 1 or 28.

35. A system comprising:
circuitry configured to provide bursts of a digital broadband broadcast transmission at a first bit rate, said bursts providing information and utilizing at least a part of a channel bandwidth, wherein at least one of said bursts comprises data of a service that is based on a second bit rate smaller than the first bit rate,
circuitry configured to provide, within the digital broadband broadcast transmission, a descriptor configured to identify at least one of said bursts and further configured to identify additional information stored in at least one of the following: a network information table, program map table and an IP/MAC notification table,
circuitry configured to detect said at least one burst based on the descriptor, and
circuitry configured to switch power to at least part of a receiver in accordance with said at least one burst.

36. A system according to claim 35, wherein the circuitry configured to detect further comprises circuitry configured to separate the digital broadband broadcast transmission based on the descriptor into first parts fit to save power in the receiver and second parts not fit to save power in the receiver.

37. A system according to claim 35, wherein at least one burst of said bursts comprises an elementary stream of the digital broadband broadcast transmission or a transport stream referred to in the network information table.

38. A system according to claim 35, wherein the digital broadband broadcast transmission at least partly comprises a time slice data broadband transmission.

39. A system according to claim 35, wherein at least one of said bursts comprises a time sliced elementary stream, and said system further comprises circuitry configured to identify at least one time sliced elementary stream.

40. A system according to claim 35, wherein the descriptor comprises information on a size of a service session contained in said at least one burst of the digital broadband broadcast transmission, and said system further comprises:
circuitry configured to compare available memory in the receiver to said size, and
circuitry configured to switch at least part of the receiver on or off based on a result obtained in said comparison.

41. A receiver comprising:
circuitry configured to receive bursts of a digital broadband broadcast transmission at a first bit rate, said transmission providing information and utilizing at least a part of a channel bandwidth, wherein at least one of said bursts comprises data of a service that is based on a second bit rate smaller than the first bit rate, circuitry configured to receive, within the digital broadband broadcast transmission, a descriptor configured to identify at least one of said bursts and further configured to identify additional information stored in at least one of the following: a network information table, program map table and an IP/MAC notification table, circuitry configured to detect said at least one burst based on the descriptor, and circuitry configured to switch power to at least part of a receiver in accordance with said at least one burst.

42. A receiver according to claim 41, wherein the circuitry configured to detect is further configured to separate the digital broadband broadcast transmission based on the descriptor into first parts fit to save power in the receiver and second parts not fit to save power in the receiver.

43. A receiver according to claim 41, wherein at least one of said bursts comprise elementary streams of the digital broadband broadcast transmission, or transport streams referred to in the network information table.

44. A receiver according to claim 41, wherein the digital broadband broadcast transmission at least partly comprises time slice data broadcast transmission.

45. A receiver according to claim 41, wherein the receiver further comprises a mobile terrestrial digital video broadcasting receiver.

46. A receiver according to claim 45, wherein the receiver further comprises a mobile station for interaction with the digital broadband broadcast transmission.

47. A receiver according to claim 41, wherein said at least one burst comprise a time sliced elementary stream, and said receiver further comprises circuitry configured to identify at least one time sliced elementary stream.

48. A receiver according to claim 41, wherein the descriptor comprises information on a size of a service session contained in said at least one burst of the digital broadband broadcast transmission, and said receiver further comprises:

circuitry configured to compare available memory in the receiver to said size, and circuitry configured to switch at least part of the receiver on or off based on a result obtained in said comparison.

49. A transmitter comprising:

circuitry configured to transmit bursts of a digital broadband broadcast transmission at a first bit rate, said transmission providing information and utilizing at least a part of a channel bandwidth, wherein at least one of said bursts comprises data of a service that is based on a second bit rate smaller than the first bit rate;

circuitry configured to transmit, as part of the digital broadband broadcast transmission, a descriptor configured to identify at least one of said bursts and further configured to identify additional information stored in at least one of the following: a network information table, program map table and an IP/MAC notification table.

50. A transmitter according to claim 49, wherein at least one of said bursts comprises an elementary streams of the digital broadband broadcast transmission or a transport stream referred to in the network information table.

51. A transmitter according to claim 49, wherein the digital broadband broadcast transmission at least partly comprises time slice data broadcast transmission.

52. A transmitter according to claim 49, wherein at least one of said bursts comprises data of a time sliced elementary stream, and the descriptor enables a receiver of the digital broadband broadcast transmission to categorize the time sliced elementary stream.

53. A method according to claim 1, wherein a time interval between at least two of said bursts is dependent upon the first bit rate.

54. The transmitter of claim 49, wherein at least one of said bursts comprises data of a time sliced elementary stream, and the circuitry configured to transmit bursts is further configured to transmit the data of the time sliced elementary stream and data of a non-time sliced stream within the digital broadband broadcast transmission, and wherein information of the descriptor enables a receiver of the digital broadband broadcast transmission to identify data of the time sliced elementary stream from data of the non-time sliced stream.

55. A receiver comprising:

circuitry configured to receive bursts of a digital broadband broadcast transmission at a first bit rate, said bursts providing information and utilizing at least a part of a channel bandwidth, wherein at least one of said bursts comprises data of a service that is based on a second bit rate smaller than the first bit rate;

circuitry configured to receive, within the digital broadband broadcast transmission, a descriptor configured to identify at least one of said bursts and further configured to identify additional information stored in at least one of the following: a network information table, program map table, and an IP/MAC notification table; and circuitry configured to categorize said at least one burst based on the descriptor into a category allowing switching of power to at least part of the receiver.

56. A receiver comprising:

circuitry configured to receive bursts of a digital broadband broadcast transmission at a first bit rate, said bursts providing information and utilizing at least a part of a channel bandwidth, wherein at least one of said bursts comprises data of a service that is based on a second bit rate smaller than the first bit rate;

circuitry configured to receive, within the digital broadband broadcast transmission, a descriptor configured to identify at least one of said bursts and further configured to identify additional information stored in at least one of the following: a network information table, program map table, and an IP/MAC notification table; and circuitry configured to categorize said at least one burst based on the descriptor into a category allowing switching of power to at least part of the receiver.

* * * * *

UNITED STATES PATENT AND TRADEMARK OFFICE
CERTIFICATE OF CORRECTION

PATENT NO.         : 8,159,982 B2                                            Page 1 of 1
APPLICATION NO.    : 10/542980
DATED              : April 17, 2012
INVENTOR(S)        : Jani Väre et al.

It is certified that error appears in the above-identified patent and that said Letters Patent is hereby corrected as shown below:

Column 15, Claim 29, Line 67:
        Please delete "stream, the" and insert -- stream, and the --

Column 18, Claim 55, Line 23-38:
        Please delete
        "A receiver comprising: circuitry configured to receive bursts of a digital broadband broadcast transmission at a first bit rate, said bursts providing information and utilizing at least a part of a channel bandwidth, wherein at least one of said bursts comprises data of a service that is based on a second bit rate smaller than the first bit rate; circuitry configured to receive, within the digital broadband broadcast transmission, a descriptor configured to identify additional information stored in at least one of the following: a network information table, program map table, and an IP/MAC notification table; and circuitry configured to categorize said at least one burst based on the descriptor into a category allowing switching of power to at least part of the receiver."

and insert

-- A method comprising:
         receiving bursts of a digital broadband broadcast transmission at a first bit rate, said bursts providing information and utilizing at least a part of a channel bandwidth, wherein at least one of said bursts comprises data of a service that is based on a second bit rate smaller than the first bit rate;
         receiving, within the digital broadband broadcast transmission, a descriptor configured to identify at least one of said bursts and further configured to identify additional information stored in at least one of the following: a network information table, program map table and an IP/MAC notification table; and
        categorizing said at least one burst based on the descriptor into a category for allowing switching of power to at least part of the receiver. --

Signed and Sealed this
Twenty-eighth Day of August, 2012

David J. Kappos
*Director of the United States Patent and Trademark Office*